Nov. 12, 1929.   C. P. WALKER   1,735,364
VARIABLE VOLTAGE SYSTEM OF SPEED CONTROL FOR MOTORS

Filed May 24, 1927

Inventor
Cranford P. Walker
By Lyon & Lyon
Attorneys

Patented Nov. 12, 1929

1,735,364

UNITED STATES PATENT OFFICE

CRANFORD P. WALKER, OF LOS ANGELES, CALIFORNIA, ASSIGNOR TO LLEWELLYN IRON WORKS, OF LOS ANGELES, CALIFORNIA, A CORPORATION OF CALIFORNIA

VARIABLE-VOLTAGE SYSTEM OF SPEED CONTROL FOR MOTORS

Application filed May 24, 1927. Serial No. 193,823.

This invention relates to a system of controlling the speeds of motors in which the motor is driven by a generator and the speed control effected through control of the field flux of the generator. Such a system is, at least as applied to elevators, known as the variable voltage system of speed control.

In the variable voltage system of speed control of motors, such as is used for the control of elevators, if full voltage is applied to the field winding of the generator which supplies the motor, the generator main field flux and voltage rise most rapidly at the instant the voltage is first applied and the rate of rise gradually decreases until the field flux and voltage finally reach a maximum value. This causes the motor which is being supplied from such a generator to have its maximum rate of acceleration approximately at the instant of starting of the motor.

Where such a motor is used to drive an elevator car, the rapid acceleration of the motor at the instant of starting the car is undesirable. It has been determined that in order to elevate passengers in comfort in an elevator car, the rate of acceleration of the car at the instant of starting should not exceed 2 or 3 feet per second per second, and rates of acceleration at the instant of starting the car in excess of 5 feet per second per second produce great discomfort to the passengers. On the other hand, it has been determined that once the car has assumed a direction of motion, its rate of acceleration may be increased to as high as from 10 to 12 feet per second per second without discomfort to the passengers.

An object of the present invention is to provide a variable voltage system of speed control for motors in which the rate of increase in the field flux and voltage of the generator and thereby the acceleration of the motor is maintained automatically at a low value at the instant of starting the motor and at a higher rate shortly subsequent to the starting of the motor.

More specifically, an object of the present invention is to provide a variable voltage system of speed control for motors adapted to produce a gradual and pleasant start of an elevator, in which the car starts at a very low rate of acceleration, which rate of acceleration gradually increases and then gradually slows down as the car approaches its maximum speed of travel.

An elevator under variable voltage control where full voltage is instantly applied to the field of the generator, decreases its acceleration in the desired manner but the maximum rate of acceleration occurs approximately at the instant of starting which is undesirable for a comfortable start. The rate of increase in the voltage of a variable voltage generator and the speed of the motor which it supplies depend upon the inductance of the main field circuit of the generator and the greater the inductance, the slower will the generator voltage and motor speed rise. To start the motor in such a system of control gradually, it is therefore necessary to have the maximum shunt field inductance at the beginning of the accelerating period, this inductance to be rapidly decreased as the acceleration progresses.

I have devised a system of motor control in which a reactor is placed in series with the main shunt field circuit of the variable voltage generator, which reactor's magnetic circuit becomes saturated soon after the acceleration has started, thereby the rate of acceleration at the instant of starting of the motor may be controlled as desired by the design of the reactor. The insertion of such a reactor in the main shunt field circuit of the generator increases the inductance of the circuit, thereby decreasing the rate of the building up of the field of the generator at the instant the voltage is first applied to it. When the magnetic circuit of this reactor becomes saturated, its inductance is reduced to a very low value and thereafter the rate at which the generator field flux and voltage increase is determined by the inductance of the generator field coils above.

When the voltage of the generator reaches its maximum or nearly its maximum value, said reactor is no longer needed in the circuit of the generator field and produces a small decrease in the maximum voltage of the generator. Therefore, a further object of the present invention is to provide means by which such reactor may be automatically cut out of the generator field circuit after the voltage of the generator has reached a predetermined value.

The present invention, together with various further objects and advantages thereof, will best be understood from a description of an example of a variable voltage system embodying the invention. For this purpose, there is hereinafter described a preferred example of such a variable voltage system, the system being described in connection with the accompanying drawings.

Figure 1:
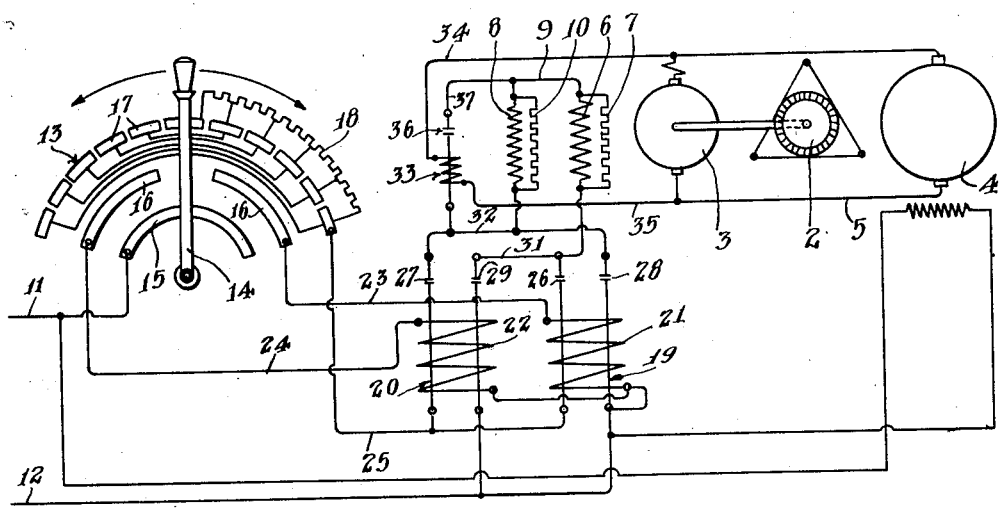
Figure 1 is an electrical diagram of the apparatus.

Referring to the drawings, the apparatus is indicated as including a motor 2 or other means for driving, preferably at constant speed, an electric generator 3. 4 indicates an electric motor driven by power from the generator 3 through lines 5. The motor 4 is the motor whose speed is to be controlled under the variable voltage system. While the invention is not necessarily confined to elevators, it is understood that the invention is particularly suited for use where the motor 4 is connected with an elevator cage in order to operate the cage. It is obvious that such connection may be of any usual or preferred form.

6 indicates the main generator field which is preferably provided with a high resistance 7 for high voltage discharge, the resistance 7 being shunted around the field 6. 8 indicates the reactor which is connected by a line 9 with the main generator field 6 so that it can be operated in series therewith and said reactor 8 is likewise provided with a resistance 10 for high voltage discharge. The reactor 8 may be of any type of reactor which is adapted to saturate itself within a comparatively short interval of time.

11 and 12 respectively indicate positive and negative direct current supply lines for applying voltage across the combined reactor and generator fields. Any suitable source of direct current voltage may be utilized for this purpose. For example, an exciter may be employed, forming part of the motor generator set which includes the motor 2 and generator 3. The main 11 is indicated as connected with a lever type of master controller 13, which is indicated as provided with a lever 14 continuously contacting with a contact 15. Said lever is also indicated as adapted to contact with one of a pair of contacts 16, one moved to either side of the central position. There are also indicated at either side of the central position of the lever 14, segmental contacts 17 interconnected by resistances 18 by which the voltage applied to the generator field may be controlled.

19 and 20 respectively indicate forward and reverse switches which have their coils 21 and 22 connected at one end with the lead 12. The other ends of the coils are connected by leads 23 and 24 with the direction contacts 16. It will therefore appear that whenever the lever 14 is moved from the center position, a circuit is made to close either the forward switch 19 or reverse switch 20. The segmental contacts 17 are connected by a line 25 with contacts 26 and 27 of the switches 19 and 20 respectively. The main 12 is also connected with contacts 28 and 29 respectively of the switches 19 and 20. The contacts 29 and 26 are connected together by a line 31 which leads to the main generator field 6. The reactor 8 is connected by the line 32 with the contacts 27 and 28.

It will thus be seen that whenever the lever 14 is moved in either direction from the center, the voltage is applied across the reactor and main generator field by the closing of either the forward switch 19 or reverse switch 20 and that the direction which the current traverses the generator field is dependent upon which direction the controller lever 14 is moved.

The system also preferably includes a switch 33 for shorting the reactor 8 whenever the voltage of the generator reaches a desired value. For this purpose, the coil of said switch is indicated as shunted across the generator terminals by lines 34 and 35 and said coil energizes a contact 36 in a line 37 shorting the reactor 8.

Figure 2:
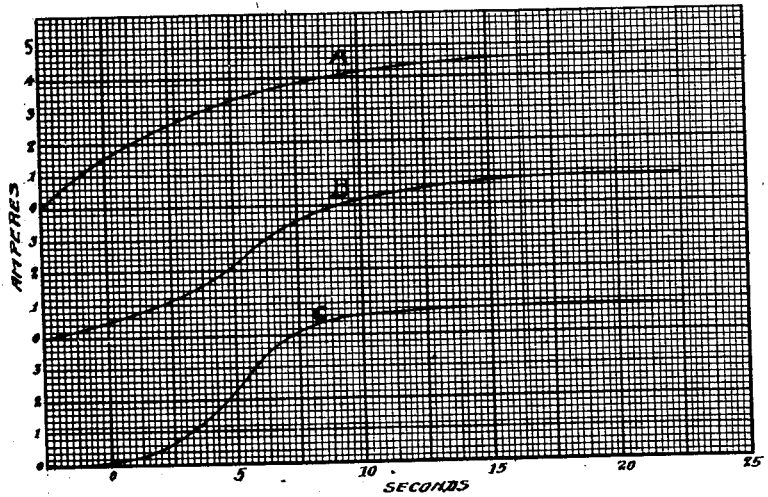
Figure 2 represents acceleration curves.

In order to illustrate more specifically the action of the present variable voltage system, reference is made to Figure 2 of the drawings, in which there is plotted, as represented by the line A, the current through the field of a generator, lacking a reactor as illustrated in the present invention, the current being plotted as ordinates against the seconds of time the field has been energized as abscissa. As will be noted from said curve just after the first energization of the field, the rate at which the current increases is the highest. In a variable voltage system of control using a generator of such type, the result would be to accelerate the motor most rapidly at approximately the instant the voltage was first applied to the generator. As before explained, this produces discomfort to the passengers of an elevator.

The curve C on the drawing represents the rate at which the current builds up to maximum value through a reactor such as the reactor 8 of the present invention. It will be seen that with such a reactor, the rate at which the current increases is low at the instant the voltage is applied and does not reach a maximum until some 3/4ths of a second later. When such a reactor is placed in series with the generator field and the voltage impressed across the combination, curve B is obtained in which it will be seen that the rate of increase of the current is maintained low at the instant the voltage is applied to the combination and the increase of current becomes greatest at about slightly over ¾ths of a second from the instant the voltage is applied. With the variable voltage system of control utilizing such a combination, the motor is automatically accelerated at a low rate for about ¼th of the accelerating period but reaches its maximum speed in substantially the same time as with the generator of curve A.

While the form of the invention herein described is well adapted for accomplishing the objects of the present invention, it is understood that various modifications and changes may be made without departing from the invention, and the invention includes all such modifications and changes as come within the following appended claims.

I claim:

1. In a variable voltage system of speed control for motors, a generator having a main field, a reactor in series with said field, said reactor having a magnetic circuit which retards the rate that the current flowing through the generator field builds up when a voltage is first applied across the combined reactor and generator field and become saturated before the generator field reaches its normal excitation, and a motor connected to said generator.

2. In a variable voltage system of speed control for an elevator motor, said elevator motor, a generator connected with said motor, said generator having a main field, and a reactor in series with said field, said reactor having a magnetic circuit which retards the rate that the current flowing through the generator field builds up when a voltage is first applied across the reactor and generator field and become saturated before the generator field reaches its normal excitation.

3. In a variable voltage system of speed control for motors, a generator having a main field, a reactor in series with said field, said reactor having a magnetic circuit which retards the rate that the current flowing through the generator field builds up when a voltage is first applied across the combined reactor and generator field and become saturated before the generator field reaches its normal excitation, a motor connected to said generator, and means for shorting out said reactor when the voltage of said generator reaches a desired value.

4. In a variable voltage system of speed control for an elevator motor, said elevator motor, a generator connected with said motor, said generator having a main field, a reactor in series with said field, said reactor having a magnetic circuit which retards the rate that the current flowing through the generator field builds up when a voltage is first applied across the reactor and generator field and become saturated before the generator field reaches its normal excitation, and means for shorting out said reactor when the voltage of said generator reaches a desired value.

5. In a variable voltage system of speed control for motors, a motor, a generator connected with said motor, a main field for said generator, and a reactor in series with said field, said reactor having inductance sufficient to prevent the voltage of the generator accelerating rapidly at the instant the exciting voltage is applied to the generator field, the reactor further having a magnetic circuit adapted to be saturated before the generator field reaches its normal excitation.

6. In a variable voltage system of speed control for motors, the combination with a motor, of a generator for supplying voltage to said motor, a main field for said generator, an inductance in series with said field, a high voltage discharge for said inductance, said inductance being adapted to materially restrain the acceleration of the voltage of the generator when the exciting voltage is applied to the main generator field, said inductance having a magnetic circuit adapted to be rapidly saturated, and an electromotive force relay shunted across said generator for shorting said inductance out of the generator field circuit.

Signed at Los Angeles, California, this 30th day of April, 1927.

CRANFORD P. WALKER.